(12) United States Patent
Hammoud et al.

(10) Patent No.: US 6,431,129 B1
(45) Date of Patent: Aug. 13, 2002

(54) METHOD AND SYSTEM FOR TRANSIENT LOAD RESPONSE IN A CAMLESS INTERNAL COMBUSTION ENGINE

(75) Inventors: Mazen Hammoud, Dearborn; Mohammad Haghgooie, Ann Arbor; Diana Dawn Brehob, Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/648,330

(22) Filed: Aug. 25, 2000

(51) Int. Cl.$^7$ .................................................. F01L 1/34
(52) U.S. Cl. .................. 123/90.15; 60/273; 123/90.16; 123/90.11
(58) Field of Search ................... 123/90.15, 90.11, 123/90.16, 90.17, 90.18, 299, 493, 306, 346, 21, 305, 286, 198 F, 179.5; 60/273, 274; 73/114

(56) References Cited

U.S. PATENT DOCUMENTS

| 4,104,991 | A | | 8/1978 | Abdoo | |
|---|---|---|---|---|---|
| 4,572,114 | A | * | 2/1986 | Sickler | .................. 123/21 |
| 4,722,315 | A | * | 2/1988 | Pickel | .................. 123/90.15 |
| 5,009,203 | A | | 4/1991 | Seki | |
| 5,022,357 | A | | 6/1991 | Kawamura | |
| 5,072,700 | A | | 12/1991 | Kawamura | |
| 5,117,790 | A | | 6/1992 | Clarke et al. | |
| 5,161,497 | A | | 11/1992 | Simko et al. | |
| 5,255,637 | A | | 10/1993 | Schechter | |
| 5,271,229 | A | | 12/1993 | Clarke et al. | |
| 5,450,824 | A | | 9/1995 | Yamane et al. | |
| 5,469,818 | A | | 11/1995 | Yoshioka et al. | |
| 5,477,822 | A | * | 12/1995 | Haghgooie et al. | .......... 123/286 |
| 5,482,017 | A | * | 1/1996 | Brehob et al. | .............. 123/299 |
| 5,496,229 | A | | 3/1996 | Miyamoto | |
| 5,578,748 | A | * | 11/1996 | Brehob et al. | ................. 73/114 |
| 5,626,109 | A | | 5/1997 | Yasumura et al. | |
| 5,679,094 | A | | 10/1997 | Nakamura et al. | |
| 5,785,028 | A | * | 7/1998 | Anderson et al. | ............ 123/305 |
| 5,845,613 | A | | 12/1998 | Yoshikawa | |
| 5,909,720 | A | | 6/1999 | Yamaoka et al. | |
| 5,941,211 | A | * | 8/1999 | Brehob et al. | .............. 123/493 |
| RE36,737 | E | * | 6/2000 | Brehob et al. | .............. 123/299 |
| 6,098,585 | A | * | 8/2000 | Brehob et al. | ........... 123/179.5 |
| 6,182,621 | B1 | * | 2/2001 | Salber et al. | ............. 123/90.15 |
| 6,244,047 | B1 | * | 6/2001 | Brehob et al. | ................. 60/274 |
| 6,257,194 | B1 | * | 7/2001 | Kerns et al. | .............. 123/198 F |
| 6,308,670 | B1 | * | 10/2001 | Hammoud et al. | ....... 123/90.15 |

* cited by examiner

Primary Examiner—Teresa Walberg
Assistant Examiner—Fadi H. Dahbour
(74) Attorney, Agent, or Firm—Carlos L. Hanze

(57) ABSTRACT

A method of operating an internal combustion engine in response to a transient load includes the steps of providing an air charge quantity required to produce a commanded air-fuel mixture within the combustion chamber, providing a fuel quantity required to produce a commanded air-fuel mixture within the combustion chamber, and displacing a quantity of the air-fuel mixture from the combustion chamber in response to the transient load. The method is especially advantageous for rapidly affecting engine response to transient loads resulting from sudden load change events, such as traction control, transmission shift and driver demand events.

18 Claims, 6 Drawing Sheets

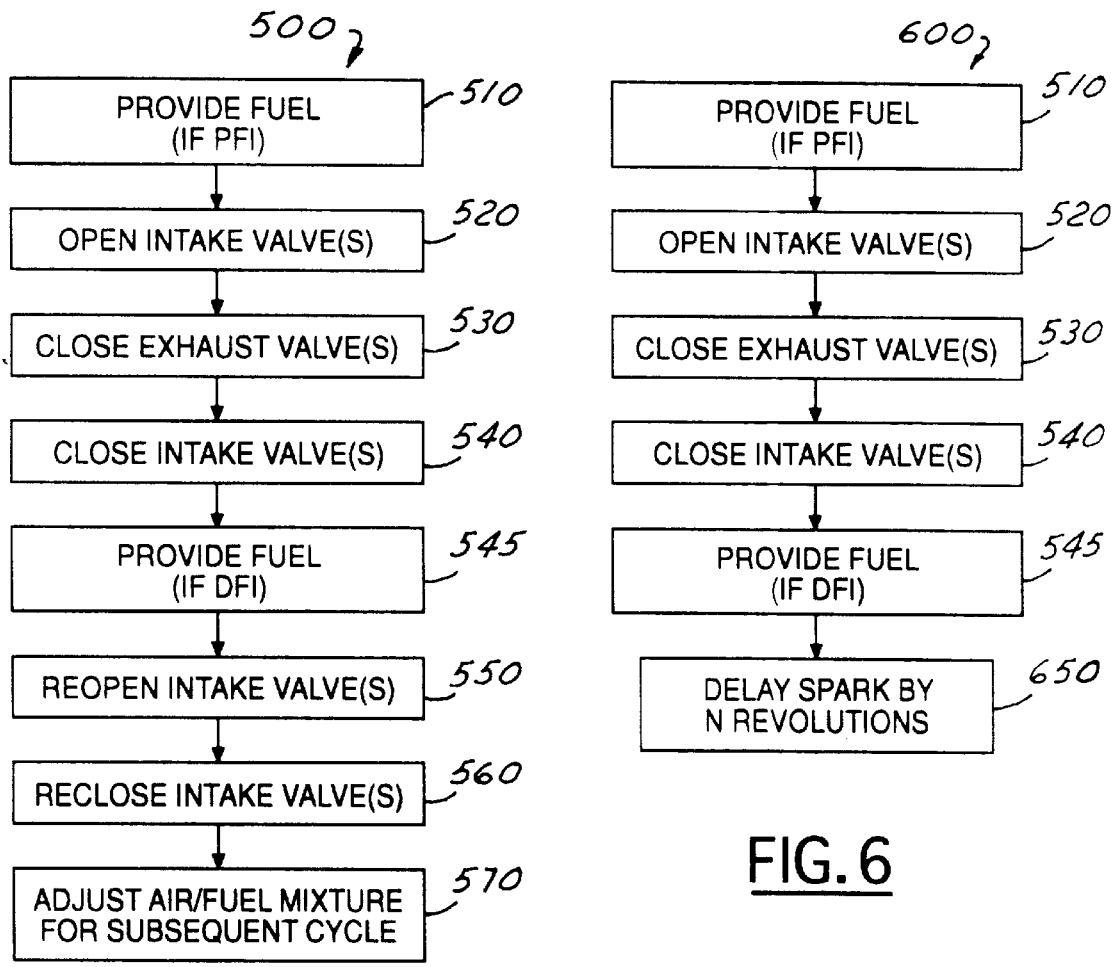

METHOD AND SYSTEM FOR TRANSIENT LOAD RESPONSE IN A CAMLESS INTERNAL COMBUSTION ENGINE

FIELD OF THE INVENTION

The present invention relates generally to methods and systems for operating a camless internal combustion engine. More particularly, the invention relates to methods and systems for using pulsed intake valve operation to adjust for transient engine loads.

BACKGROUND OF THE INVENTION

Camless internal combustion engines are known in the art and are used primarily to provide variability in valve timing, duration and lift. Valves in camless engines are typically actuated using electromechanical or electrohydraulic actuators, and as such can be actuated accordingly to achieve optimal or desired engine performance. A typical electromechanical actuator uses one or more solenoids to generate a magnetic field to attract and displace an armature, which in turn actuates one or more corresponding valves, whereas a typical electrohydraulic actuator utilizes fluid pressure controlled by one or more solenoids to operate corresponding valves. The opening and closing times of the valves are typically controlled as a function of one or more engine parameters such as speed, demanded engine torque and crankshaft angular position.

Internal combustion engines, both camless and cam-based, are often susceptible to sudden transient load demands, e.g., traction control events, transmission shifts, sudden changes in driver demand, etc., which may be considered to achieve desired engine performance. Although conventional spark retard techniques have been used to compensate for sudden load changes, such techniques remain undesirable due to inefficient burning of the air-fuel mixture and heating of corresponding exhaust system components.

As such, the inventors have recognized that camless engines provide an opportunity to respond to rapid changes in demanded load without using conventional spark retard techniques. Such an opportunity exists, for example, when there is a need to respond to a rapid load change occurring during the present engine cycle after a commanded amount of fuel and air charge has already been provided to one or more combustion chambers of an internal combustion engine.

SUMMARY OF THE INVENTION

The aforedescribed limitations and inadequacies of conventional control methods are substantially overcome by the present invention, in which a method is provided for controlling valve actuation in an internal combustion engine. The method, which can be used to operate direct fuel injection (DFI), port fuel injection (PFI) and diesel internal combustion engines, includes the steps of providing quantities of air charge and fuel required to produce a commanded air-fuel mixture within a combustion chamber of the internal combustion engine, and displacing a quantity of the air-fuel mixture from the combustion chamber in response to the transient load. A combustion event is then performed to burn the air-fuel mixture remaining within the combustion chamber.

An advantage of the present invention is that changes in commanded loads occurring after a commanded air-fuel mixture has been provided to the combustion chamber can be adjusted during the present engine cycle to compensate for sudden changes in load demand. Sudden changes in load demand can result, for example, from sudden or unexpected traction control, transmission shift and driver demand events. In addition, the disclosed method avoids the disadvantages of conventional spark retard techniques such as reduced air/fuel burn efficiency and overheating of a corresponding exhaust system.

In accordance with another preferred method, the intake and exhaust valves of the internal combustion engine are closed accordingly to introduce an amount of air charge required to produce a commanded air-fuel mixture within the combustion chamber. An amount of fuel is also provided, either before or after the air charge is provided, to produce the commanded air-fuel mixture. In response to a transient load, the intake valves are then reopened and reclosed during a subsequent compression stroke of the engine to displace a portion of the air-fuel mixture and thus adjust the volume of the air-fuel mixture within the combustion chamber. Optionally, the method further includes the step of adjusting the commanded air-fuel mixture -for a subsequent engine cycle to compensate for the displaced amount of air-fuel mixture.

Alternatively, in lieu of reopening and reclosing the intake valve, another preferred method of the present invention includes the step of delaying a combustion event for the engine cycle by n number of engine revolutions. Delaying or "skipping" a corresponding combustion event for one or more engine revolutions thereby compensates for the transient load.

In accordance with another aspect of the present invention, a corresponding valve control system is provided for operating a camless internal combustion engine in response to a transient load. The system includes at least one sensor from which the transient load is computed, an electronic actuator coupled to the at least one intake valve, and an engine controller coupled to the at least one sensor, the electronic actuator and the at least one fuel injector. Advantageously, the engine controller is adapted for controlling the supply of fuel and air charge quantities required to produce a commanded air-fuel mixture within the combustion chamber, and for controlling the displacement of a portion of the air-fuel mixture from the combustion chamber in response to the transient load.

Still further, in accordance with yet another aspect of the present invention, an article of manufacture is provided for operating a camless internal combustion engine in response to a transient load, wherein the internal combustion engine is characterized by a predefined engine cycle and a plurality of cylinders each having a corresponding combustion chamber, each cylinder having at least one exhaust valve, at least one intake valve and at least one fuel injector for providing fuel to the combustion chamber. The article of manufacture includes a computer usable medium and a computer readable program code embodied in the computer usable medium for directing the computer to perform the steps of controlling the operation of the at least one exhaust valve, the at least one electronically-actuated intake valve and the at least one fuel injector. The program code further directs the computer to control the supply of fuel and air charge quantities required to produce a commanded air-fuel mixture within the combustion chamber, and to control the displacement of a portion of the air-fuel mixture from the combustion chamber in response to the transient load.

Alternatively, a system and an article of manufacture are provided having an engine controller and computer program code, respectively, for delaying a corresponding combustion event by one or more engine revolutions.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 5 is a flow diagram showing the preferred method of the present invention corresponding to the valve timing diagram of FIG. 4;

FIG. 6 is a flow diagram showing another preferred method of the present invention;

DETAILED DESCRIPTION OF THE PREFERRED EMBODIMENTS

Figure 1:
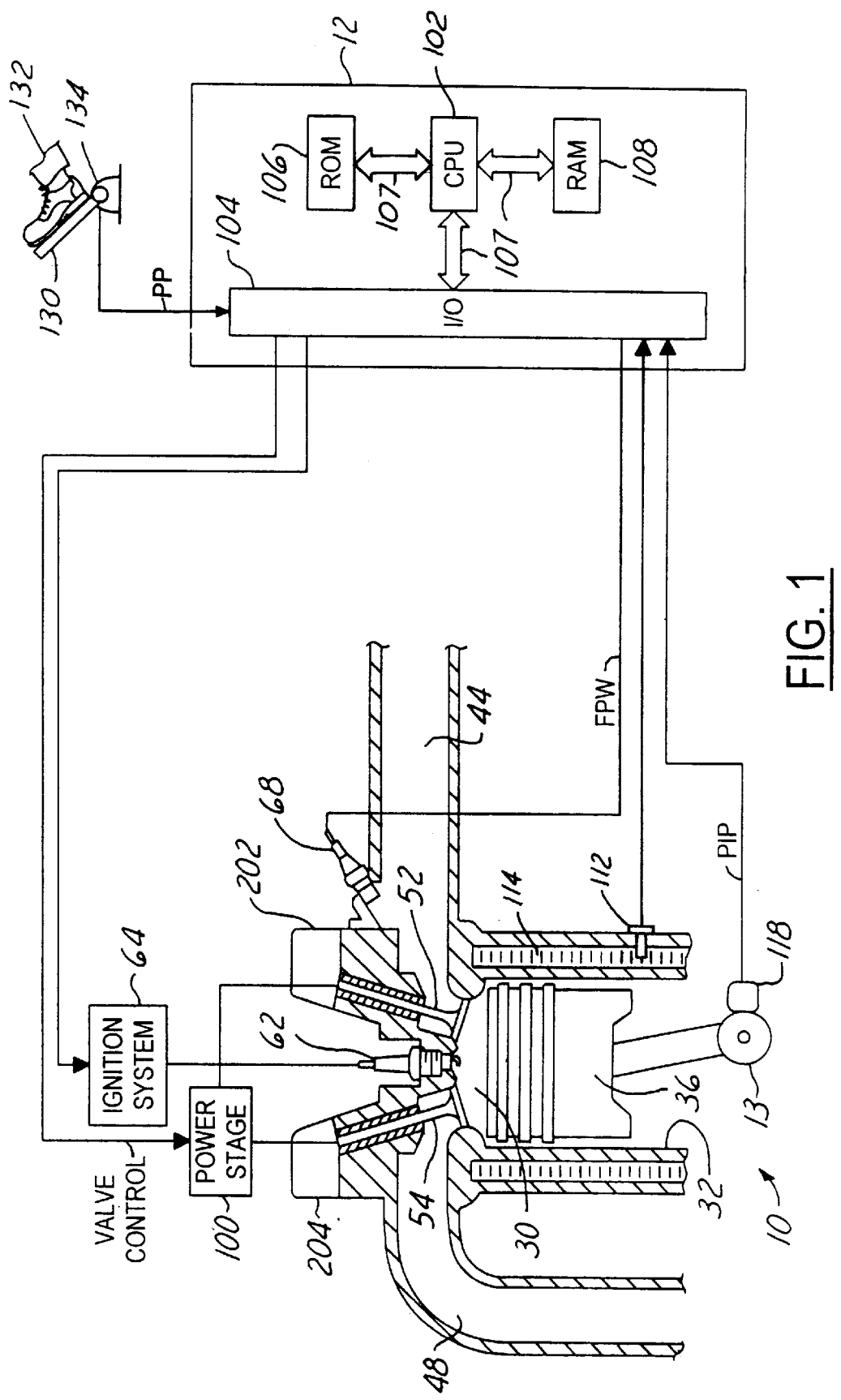
FIG. 1 is a block diagram of a camless internal combustion engine using the valve control methods and systems of the present invention.

FIG. 1 shows a block diagram of a camless internal combustion engine 10 using the valve actuation control methods and systems of the present invention. A "camless engine" for the purposes of this disclosure is any engine having at least one electronically actuated intake valve and any given number of other electronically actuated or cam-based intake and/or exhaust valves. An "electronically actuated" valve is understood to be any valve that is actuated using an electromechanical, electrohydraulic or equivalent electronically-driven actuator.

The engine in accordance with the present invention can be a direct fuel injection (DFI), port fuel injection (PFI) or diesel internal combustion engine. A DFI engine, as shown in FIG. 1, includes electronic fuel injectors disposed within the combustion chambers for providing fuel directly into the combustion chamber. Typically, fuel is provided after or during air charge introduction into the combustion chamber. By contrast, fuel in a PFI engine (not shown) is first injected into a corresponding intake port disposed outside the combustion chamber, followed by induction of the air charge.

By way of example and not limitation, the engine 10 of FIG. 1 is a four-stroke DFI internal combustion engine having a plurality of cylinders (only one shown), each cylinder having a combustion chamber 30 and cylinder walls 32 in cooperation with piston 36 positioned therein and coupled to a crankshaft 13. The combustion chamber 30 communicates with corresponding intake and exhaust manifolds 44 and 48, respectively, via intake and exhaust valves 52 and 54. The intake and exhaust valves 52 and 54 are actuated via exemplary electromechanical valve actuators 202 and 204, respectively, each having one or more actuator components as shown and described below with reference to FIG. 2.

Figure 2:
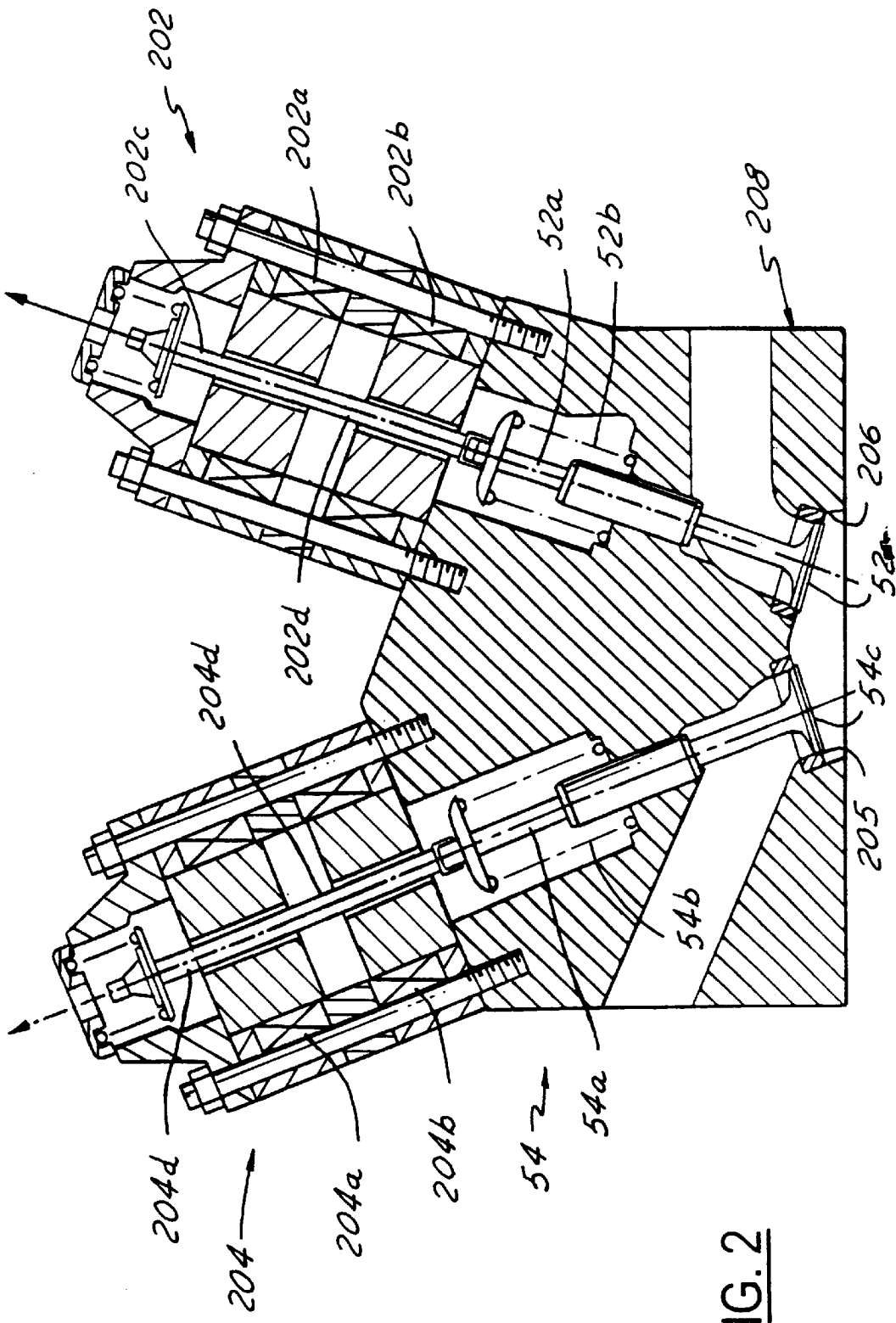
FIG. 2 is a detailed schematic of exemplary electromechanical valves controlled by the valve control methods and systems of the present invention.

FIG. 2 shows a detailed schematic of the intake and exhaust valves 52 and 54 shown in FIG. 1. The valves 52 and 54, which are shown by way of example and not limitation, include valve stems 52a and 54a, valve springs 52b and 54b, and valve heads 52c and 54c. The upper parts of the valve stems 52a and 54a are arranged so as to contact the electromechanical actuators 202 and 204, each of which include electromagnetic coils 202a, 204a, 202b and 204b, and actuator components 202c, 204c, 202d and 204d. Depending upon the current (control) signals provided to the actuators 202 and 204, the valves 52 and 54 are actuated into "opened" or "closed" positions relative to corresponding valve seats 205 and 206 disposed on the inside of the cylinder block 208.

Referring again to FIG. 1, a valve control system is provided for opening and closing the intake and exhaust valves 52 and 54 of the camless internal combustion engine 10. The valve control system includes valve actuators 202 and 204 coupled to the intake and exhaust valves 52 and 54, respectively, and preferably a power stage 100 for conditioning and providing control signals required to actuate the valves, and an electronic engine controller 12 coupled to the power stage 100 for providing the valve control signals to the power stage 100.

In accordance with an aspect of the present invention, the valve control system is arranged and constructed so as to operate the engine 10 in response to a transient load. A "transient load" is defined herein as a sudden change in commanded engine load caused by a sudden load change event, e.g., traction control, transmission shift, driver demand, etc. Such a transient load, for example, can occur in an internal combustion engine before a combustion event but after fuel and air charge has already been provided to the combustion chamber.

Therefore, in accordance with a preferred embodiment of the present invention, the engine controller 12 is coupled to one or more sensors for detecting a transient load. The sensor for example, can be pedal position sensor, one or more wheel speed or traction control sensors, or one or more sensors for detecting transmission gear speed. In the example shown in FIG. 1, a pedal position sensor 134 is shown for providing an accelerator pedal 130 position (PP) commanded by a driver 132. The engine controller 12 uses the PP information to derive a required torque, which is then used to compute a required or "commanded" fuel pulse width (FPW) having a commanded injection duration to operate a fuel injector 68 coupled to the engine controller 12. The computation of commanded torque and corresponding fuel pulse widths can be performed using any known method and as such is not described in detail in the present application. The engine controller 12 then provides an appropriate signal to an ignition system 64, which in turn provides a spark ignition signal to spark plug 62.

As further shown in FIG. 1, the engine controller 12 also receives various signals from other sensors coupled to engine 10. Such sensors may including, for example, a temperature sensor 112 coupled to cooling jacket 114 for measuring engine coolant temperature (ECT) and a sensor 118 coupled to crankshaft 13 for indicating the operating speed (N) of the engine 10. Preferably, the engine controller 12 includes a central processing unit (CPU)/microprocessor 102, input/output ports 104, random access memory (RAM) 108, read-only memory (ROM) 106 and a data bus 107. The engine controller 12 further includes a computer program embodied in the computer memory 106 and 108 for implementing the method of the present invention as described below with reference to FIGS. 5 through 8.

Figure 3:
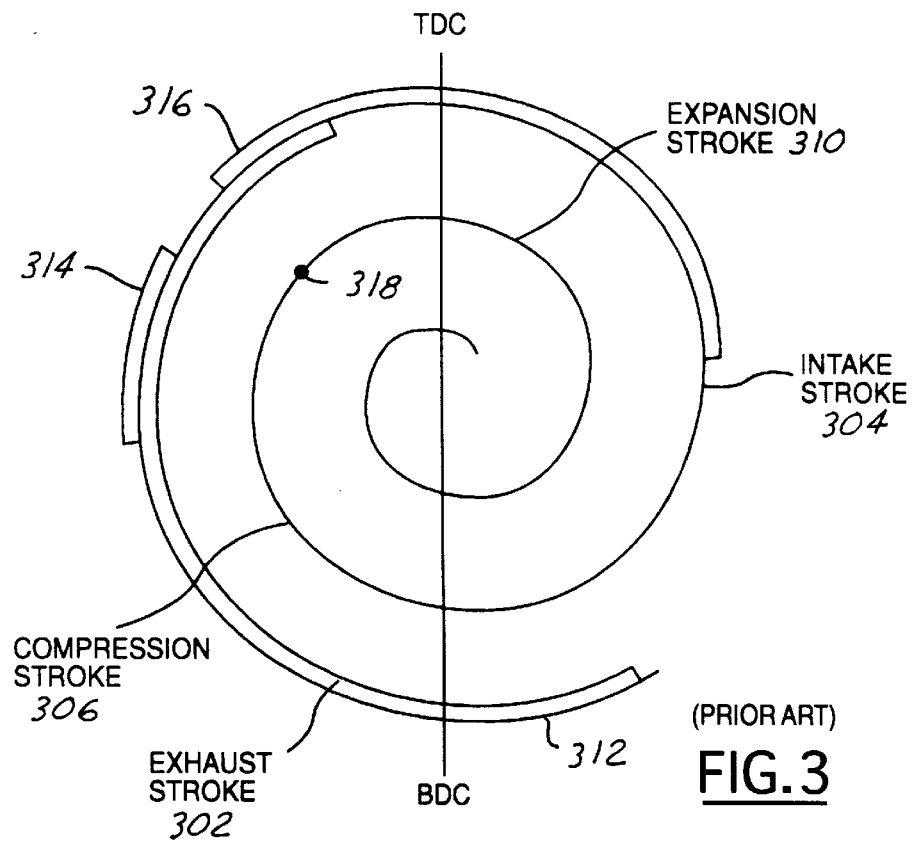
FIG. 3 is a valve timing diagram corresponding to a conventional method of operating intake and exhaust valves of an internal combustion engine.

FIG. 3 shows a timing diagram of a conventional method of operating intake and exhaust valves of an internal combustion engine, and is described herein for an understanding of the present invention. As shown in FIG. 3, the intake valve opening and closing events occur during an intake stroke of the engine combustion cycle ("engine cycle") so as to produce a commanded air-fuel mixture within the combustion chamber. The valve events 312 and 316 are performed during the exhaust and intake strokes 302 and 304, respectively, as known in the art to optimize engine performance. Fuel is then injected as shown by 314 in accordance with a commanded fuel pulse duration as discussed above. Nominally, a spark ignition system is then commanded by the engine controller to provide a spark ignition signal, i.e., combustion event, at 318.

Figure 4:
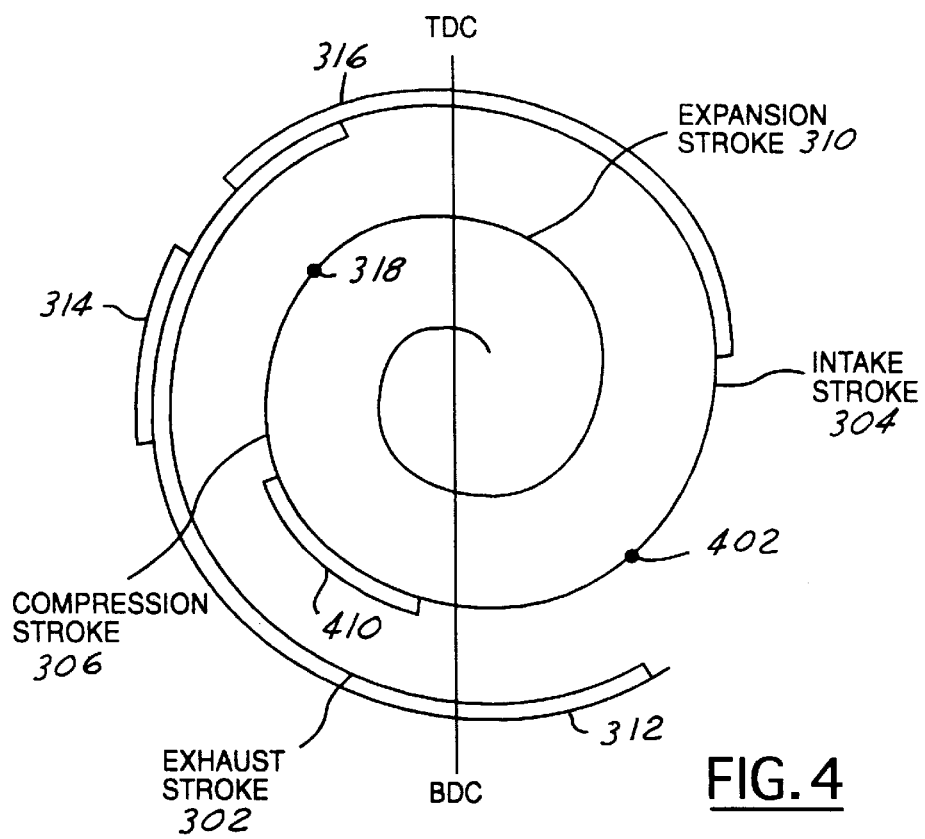
FIG. 4 is a valve timing diagram corresponding to a preferred method of the present invention.

By comparison, FIG. 4 shows a valve timing diagram corresponding to a preferred method of the present invention. In accordance with the preferred method, which is described below with reference to FIG. 5, the engine controller not only controls the opening and closing of the intake valve as shown in FIG. 4, but also generates the appropriate control signals used by the corresponding valve actuator to reopen and reclose the intake valve during a subsequent compression stroke of the engine cycle. The reopening and reclosing steps are performed in response to a transient load occurring, for example, at a time 402 after the intake valve has already been closed and the commanded air-fuel mixture supplied to the combustion chamber.

The term "reopening" with respect to the intake valve is used to refer to the reopening of the valve at a time after the closing of the valve during the same engine cycle. "Reclosing" of the intake valve occurs after it has been reopened. The method of the present invention, as depicted in FIG. 4 and described below with reference to FIG. 5, is applicable to DFI engines having multiple intake valves for each cylinder, and can be modified to reclose and reopen one, some or all of the intake valves as required in response to a transient load. Similarly, the method of the present invention can be adapted and made applicable to PFI engines. The method can thus be used where fuel is provided either before, after or while the air charge is being introduced into the combustion chamber.

Referring to FIG. 5, the method 500 of the present invention includes the steps of opening the intake valve in accordance with an intake stroke of the engine cycle, step 510, closing the exhaust valve in accordance with the intake stroke, step 520, and closing the intake valve during the intake stroke, step 530. The opening and closing steps 510, 520 and 530 are performed, as appreciated by those skilled in the art, just prior to or during the intake stroke to produce a commanded air-fuel mixture within the combustion chamber corresponding to a commanded torque derived by the electronic engine controller. Further, a commanded amount of fuel is provided, step 540, by injecting fuel directly into a corresponding combustion chamber (DFI) or into a corresponding intake port (PFI). For DFI engines, fuel providing step 540 is applicable; for PFI engines, fuel is provided, step 545, prior to the valve opening and closing steps 510–530.

The actual timing of the valve opening, valve closing, fuel injection and spark ignition events are commanded as known and appreciated in the art to optimize engine performance, but in accordance with the preferred method of the present invention are nominally scheduled as follows: exhaust valve commanded to open at 45° before bottom-dead-center (BDC); fuel injection commanded at 80° after BDC; intake valve commanded to open at 50° before top-dead-center (TDC); exhaust valve commanded to close at 35° before TDC; intake valve commanded to close at 80° after TDC; and spark ignition at 50° before TDC. The above-indicated event timings are not intended to limit the scope of the present invention.

The method 500 further includes the step of reopening the intake valve, step 550, nominally at 30° after BDC, during a subsequent compression stroke 306 of the engine cycle to adjust the commanded air-fuel mixture in response to the transient load. The reopening of the intake valve, which occurs as shown by event 410 in FIG. 4, is performed during the compression stroke 306 after fuel injection and closing of the exhaust valve. Preferably, the valve reopening event 410 is a single or series of pulsed valve operations using the engine controller and valve actuators. With reference to the valve reopening event 410 of FIG. 4, the period of the time during which the valve is reopened corresponds to a valve reopening duration calculated by the engine controller which is based at least in part upon the difference between the transient load and the commanded load, i.e., the load resulting in the air-fuel mixture in the combustion chamber upon closing of the intake valve in accordance with step 540. Typically, the greater the difference between the transient load and the commanded load, the longer the valve reopening duration.

In accordance with a further aspect of the present invention, the method also includes the step 550 of adjusting the commanded air-fuel mixture for a subsequent cycle of the internal combustion engine to compensate for the amount of air-fuel mixture displaced during the preceding engine cycle. Consider again the timing diagram of FIG. 5. In accordance with the present method, if the intake valve is reopened and reclosed as shown, a certain volume of the commanded air-fuel mixture is displaced from the combustion chamber. Thus, for the subsequent engine cycle of the engine, calculation of the fuel injection duration for the subsequent cycle must take into account the volume of the displaced air-fuel mixture resulting from the reopening and reclosing of the intake valve during the previous engine cycle. Accordingly, the fuel injection duration for the next engine cycle $ID_{NEXT}$ is adjusted by subtracting an amount $ID_{DELTA}$ proportional to the amount of air-fuel mixture displaced during the previous cycle.

Alternatively, the method according to the present invention can include the step of delaying a subsequent opening of the intake valve by leaving the valve closed for at least one engine revolution, or by skipping a plurality of successive engine revolutions occurring immediately after the occurrence of the valve reopening step. Preferably, the intake and exhaust valves are disabled and fuel injection stopped during the one or more subsequent engine revolutions.

Further, as shown by the flow chart of FIG. 6, an alternative method of the present invention similarly includes the steps of providing fuel to the combustion chamber, step 510, opening the intake valve in accordance with an intake stroke of the engine cycle, step 520, closing the exhaust valve in accordance with the intake stroke, step 530, and closing intake valve during the intake stroke, step 540. In the present method, however, the reopening and reclosing steps are instead replaced with the step of delaying or "skipping" a corresponding spark event for one or more engine revolutions, step 650. In accordance with the present invention, the engine controller delays the occurrence of the spark event so as to eliminate the difference between the commanded load and the transient load. Preferably, the spark event can be delayed by a single engine revolution, i.e., 360 degrees, or a multiple number of engine revolutions, n*360 degrees wherein n is an integer number of engine revolutions.

Figure 7:
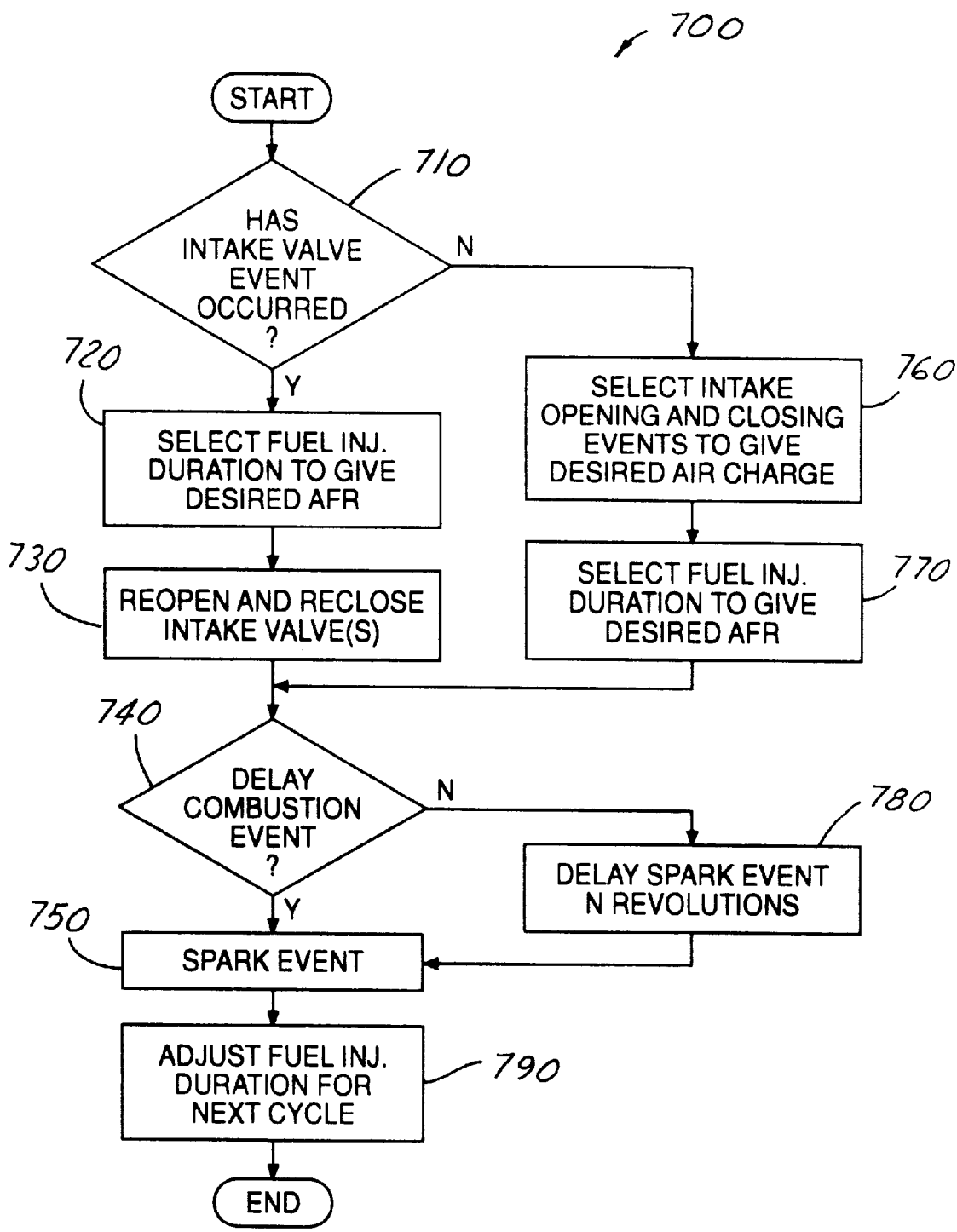
FIG. 7 is a flow diagram showing a preferred method of the present invention for use with a direct fuel injection (DFI) internal combustion engine.

FIG. 7 shows another preferred method of the present invention. In accordance with method 700, which is adapted for use with a camless DFI internal combustion engine, an initial step 710 is performed to determine whether the an intake event, i.e., intake valve opening and closing, for the current engine cycle has occurred prior to the detection of a transient load. If the intake event has not occurred, then the intake valve is opened and closed so as to introduce the required amount of air charge taking into account the transient load, step 760. The required amount of fuel is then provided, step 770, again taking into account the transient load.

However, if the valve intake event has started or been completed prior to transient load detection, then an amount of fuel is provided, step 730, so as to produce the commanded air-fuel mixture, i.e., the amount of air-fuel mixture required prior to the occurrence of the transient load. An amount of the commanded air-fuel mixture is then displaced in response to the detected transient load by reopening and reclosing the intake valve, step 730.

Regardless of whether the air-fuel mixture is displaced, a comparison of the desired air-fuel mixture volume (taking into account the transient load) and the actual air-fuel mixture volume is performed to determine whether the spark event should be delayed, step 740. If the difference between the desired and actual volumes exceeds a predefined limit, then the spark event is delayed by an appropriate number of engine revolutions, step 780. Otherwise, the spark event occurs as originally scheduled for the current engine cycle, step 750.

Optionally, and additional step 790 is performed to adjust the fuel injection duration for a subsequent engine cycle to compensate for the quantity of air-fuel mixture displaced in accordance with step 730.

Figure 8:
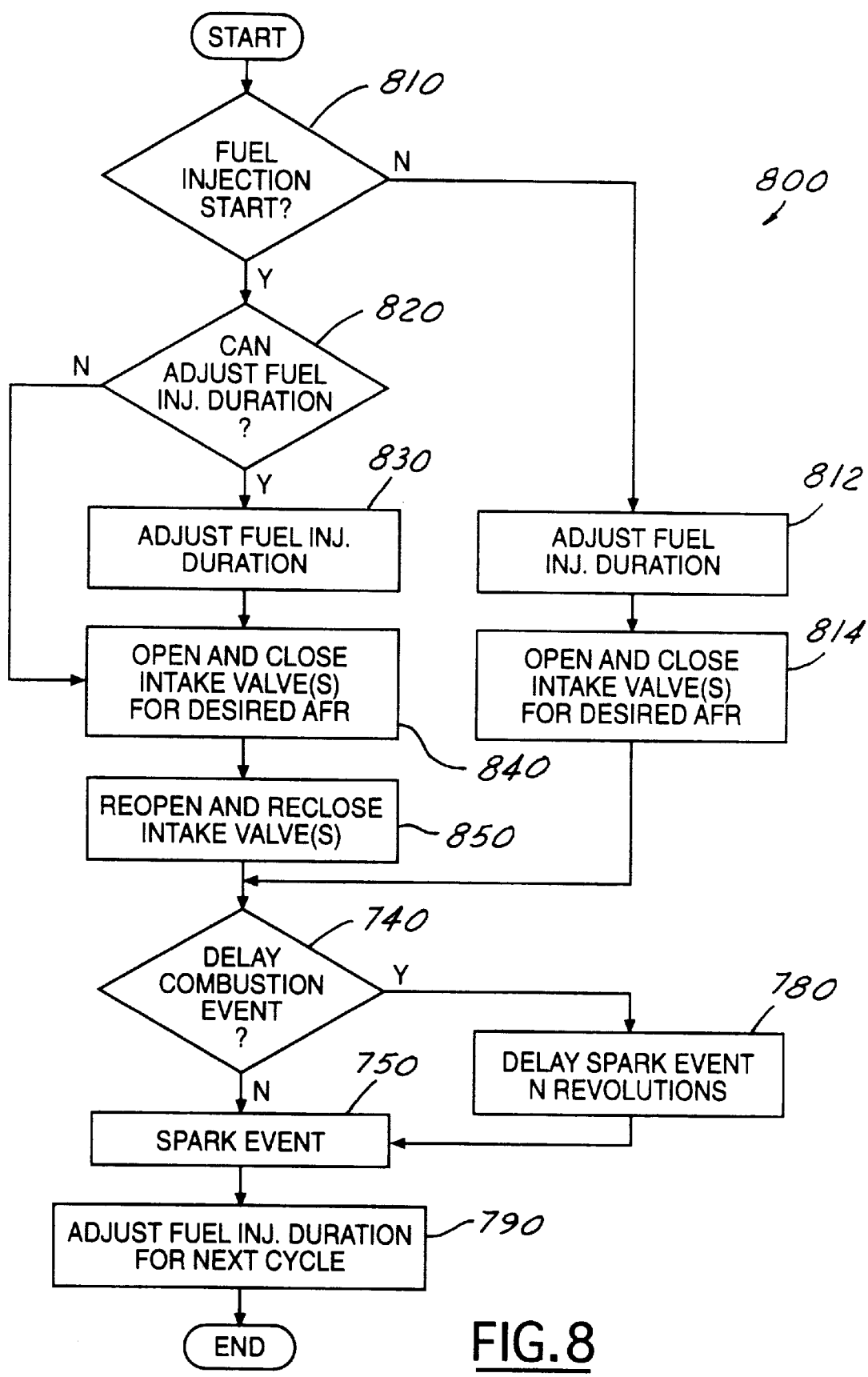
FIG. 8 is a flow diagram showing a preferred method of the present invention for use with a port fuel injection (PFI) internal combustion engine.

FIG. 8 shows a preferred method of the present invention adapted for use with a camless PFI internal combustion engine. In accordance with method 800, step 810 is performed to determine whether fuel injection has started prior to the detection of a transient load. If fuel injection has not started, then the fuel injection duration is adjusted to account for the detected transient load, step 812. The intake valves are then opened and closed to introduce the required amount of air charge, step 814, again taking into account the detected transient load.

If, however, fuel injection has started prior to detection of the transient load, step 820 is performed to determine whether the fuel injection duration can be adjusted to account for a subsequently detected transient load. If the fuel injection duration can be adjusted, an adjustment is made, step 830. The intake valve is then opened and closed, step 840, to introduce an amount of air charge required to produce the commanded air-fuel mixture, i.e., the amount of air-fuel mixture required prior to the occurrence of the transient load. If required, step 850 is performed to displace a portion of the air-fuel mixture. Steps 740, 750, 780 and 790 are then performed as described above with reference to FIG. 7.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A method of operating an internal combustion engine in response to a transient load, the internal combustion engine having a predefined engine cycle, a combustion chamber, and at least one exhaust valve and at least one electronically-actuated intake valve, said method comprising:

providing an air charge quantity required to produce a commanded air-fuel mixture within the combustion chamber;

providing a fuel quantity required to produce the commanded air-fuel mixture within the combustion chamber; and displacing a quantity of the air-fuel mixture from the combustion chamber, in response to the transient load, after the air-fuel mixture has been provided to the combustion chamber.

2. The method according to claim 1, further comprising the step of performing a combustion event to burn the air-fuel mixture remaining within the combustion chamber.

3. The method according to claim 2, further comprising the step of delaying the combustion event by an appropriate number of engine revolutions.

4. The method according to claim 1, further comprising the step of adjusting a fuel injection duration for a subsequent engine cycle to compensate for the displaced quantity of air-fuel mixture.

5. The method according to claim 1, wherein said fuel providing step is performed concurrently with or after said air quantity providing step.

6. The method according to claim 1, wherein said fuel providing step is performed prior to said air charge quantity providing step.

7. A method of operating an internal combustion engine in response to a transient load, the internal combustion engine having a predefined engine cycle and at least one exhaust valve, at least one electronically-actuated intake valve and at least one electronically-controlled fuel injector in cooperation with a corresponding combustion chamber, said method comprising:

providing an amount of fuel via the fuel injector required to produce a commanded air-fuel mixture within the combustion chamber;

opening the at least one intake valve in accordance with an intake stroke of the engine cycle;

closing the at least one exhaust valve in accordance with the intake stroke;

closing the at least one intake valve during the intake stroke, said intake and exhaust valve opening and closing steps being performed to introduce an amount of air charge into the combustion chamber required to produce the commanded air-fuel mixture within the combustion chamber;

reopening the at least one intake valve during a subsequent compression stroke of the engine; and reclosing the at least one intake valve during the subsequent compression stroke of the engine cycle, said valve reopening and reclosing steps being performed in response to the transient load to displace an amount of the commanded air-fuel mixture from the combustion chamber.

8. The method according to claim 7, wherein said fuel providing step comprises:
   deriving a fuel injection duration; and
   injecting the fuel in accordance with the fuel injection duration.

9. The method according to claim 7, wherein said fuel providing step is performed concurrently with or after said intake valve opening and closing steps.

10. The method according to claim 7, wherein said fuel providing step is performed prior to said intake valve opening and closing steps, and further wherein said fuel providing step includes the steps of:
   deriving a corresponding fuel injection duration; and
   adjusting the fuel injection duration in response to the transient load.

11. The method according to claim 7, wherein said step of reopening the at least one intake valve comprises:
   deriving a valve reopening duration based at least in part on the transient load; and
   reopening the at least one intake valve in accordance with the valve reopening duration.

12. The method according to claim 7, further comprising the step of adjusting an amount of fuel to be provided during a subsequent cycle of the internal combustion engine to compensate for the amount of air-fuel mixture displaced in accordance with said valve reopening and reclosing steps.

13. The method according to claim 7, further comprising the step of delaying a subsequent opening of the at least one intake valve for at least one engine revolution after the occurrence of said reopening step.

14. The method according to claim 7, further comprising the step of delaying a subsequent opening of the at least one intake valve for a plurality of successive engine revolutions of the internal combustion engine.

15. The method according to claim 7, wherein:
   said step of reopening the at least one intake valve comprises:
      deriving a valve reopening duration based at least in part on the transient load; and
      reopening the at least one intake valve in accordance with the valve reopening duration; and
   said method further comprises the step of adjusting the commanded air-fuel mixture for a subsequent cycle of the internal combustion engine to compensate for the amount of air-fuel mixture displaced in accordance with said valve reopening and reclosing steps, said step of adjusting the commanded air-fuel mixture for a subsequent cycle comprising:
      deriving a fuel injection duration for a subsequent engine cycle; and
      deriving a fuel injection correction duration for the subsequent engine cycle based at least in part on the valve reopening duration; and
      updating the fuel injection duration for the subsequent engine cycle based on the value of the fuel injection correction duration.

16. A method of operating an internal combustion engine in response to a transient load, the internal combustion engine having a predefined engine cycle and at least one exhaust valve, at least one electronically-actuated intake valve and at least one electronically-controlled fuel injector in cooperation with a corresponding combustion chamber, said method comprising:
   providing an amount of fuel via the fuel injector required to yield a commanded air-fuel mixture within the combustion chamber
   opening the at least one intake valve in accordance with an intake stroke of the engine cycle;
   closing the at least one exhaust valve in accordance with the intake stroke;
   closing the at least one intake valve during the intake stroke, said intake and exhaust valve opening and closing steps being performed to introduce an amount of air charge into the combustion chamber required to produce the commanded air-fuel mixture within the combustion chamber; and
   delaying a corresponding combustion event of the engine cycle by at least one engine revolution in response to the transient load.

17. The method according to claim 16, wherein said fuel providing step is performed concurrently with or after said intake valve opening and closing steps.

18. The method according to claim 16, wherein said fuel providing step is performed prior to said intake valve opening and closing steps, and further wherein said fuel providing step includes the steps of:
   deriving a corresponding fuel injection duration; and
   adjusting the fuel injection duration in response to the transient load.

* * * * *